(12) United States Patent
Montagna et al.

(10) Patent No.: US 8,356,088 B2
(45) Date of Patent: Jan. 15, 2013

(54) CONFIGURATION MANAGEMENT UTILITY

(75) Inventors: James Charles Montagna, Matthews, NC (US); Martin Thomas Gajan, Charlotte, NC (US); Anthony Keith Stone, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 322 days.

(21) Appl. No.: 12/916,192

(22) Filed: Oct. 29, 2010

(65) Prior Publication Data
US 2012/0110142 A1    May 3, 2012

(51) Int. Cl.
*G06F 15/177*    (2006.01)
*G06F 15/173*    (2006.01)

(52) U.S. Cl. ........ 709/220; 709/221; 709/222; 709/223; 709/224; 711/162; 711/111; 711/112; 711/114; 711/204; 707/649

(58) Field of Classification Search .......... 709/220–224
See application file for complete search history.

(56) References Cited

U.S. PATENT DOCUMENTS

| | | | | |
|---|---|---|---|---|
| 7,325,111 | B1 * | 1/2008 | Jiang et al. | 711/162 |
| 2003/0233431 | A1 * | 12/2003 | Reddy et al. | 709/221 |
| 2003/0233571 | A1 * | 12/2003 | Kraus et al. | 713/200 |
| 2011/0178989 | A1 * | 7/2011 | Watanabe et al. | 707/649 |

* cited by examiner

*Primary Examiner* — Jude Jean Gilles
(74) *Attorney, Agent, or Firm* — Michael A. Springs; Moore and Van Allen, PLLC; Jeffrey R. Gray

(57) ABSTRACT

Embodiments of the present invention provide apparatuses and methods for managing the configuration settings of one or more servers within a business. The configuration management apparatuses and methods generally relate to creating a configuration schema; creating configuration items to assign to the configuration schema; assigning the configuration schema to one or more servers in the business; capturing a snapshot of the configuration settings for a server based on the configuration schema and assigning it to the configuration schema as the reference snapshot; capturing a current snapshot of the actual configuration settings for one or more servers; and comparing the reference snapshot with the current snapshot to determine the differences in the configuration settings. Embodiments of the present invention also allow a report to be generated that displays the differences between the reference snapshot and the current snapshot, such as the new settings, changed settings, and missing settings.

48 Claims, 8 Drawing Sheets

From: Configuration Management Application
Sent: Wednesday, September 29, 2010 5:54 PM
To: EMAIL ADDRESS
Subject: KOREA [15 Changed, 4 Missing] —706

—700

CMA Snapshot Execution Report (9/30/2010 4:00:14 AM)
702—Started 9/30/2010 4:00:17 AM
704—Finished 9/30/2010 6:54:14 AM

| | | |
|---|---|---|
| 712— | Baseline Items: | 0 |
| 714— | New Items: | 0 |
| 716— | Changed Items: | 15 |
| 718— | Missing Items: | 4 |
| 720— | Errors Encountered: | 0 |
| 722— | Servers Processed: | 8 |
| 724— | Config Schemas Processed: | 12 |

Results attached—726

| 802 Server | 804 Status | 806 Identifier | 808 Result | 810 Schema |
|---|---|---|---|---|
| XXXXXXXXXX | CHANGED | D:\X | Type= FILE<br>Current Size= 36.08 KB<br>Reference Size= 37.08 KB<br>Current Modified [OLDER]= 01/31/2008 21:58:52<br>Reference Modified= 07/21/2010 21:02:56<br>Current Permissions= XXX<br>Reference Permissions= XXX | CAMM Mail Processor |
| XXXXXXXXXX | CHANGED | D:\X | Type= FILE<br>Current Size= 180.07 KB<br>Reference Size= 184.08 KB<br>Current Modified [OLDER]= 01/31/2008 22:27:34<br>Reference Modified= 07/21/2010 21:15:58<br>Current Permissions= XXX<br>Reference Permissions= XXX | CAMM Mail Processor |

FIG. 7

CONFIGURATION MANAGEMENT UTILITY

FIELD

This invention relates generally to managing configuration settings within a business, and more particularly, embodiments of the invention relate to apparatuses and methods for compiling, comparing, and reporting on the configuration settings of servers within a business in order to track, investigate, and manage the configuration settings of the servers.

BACKGROUND

Businesses can have dozens, hundreds, or thousands of servers or other computer systems that run applications that are used to operate the business. These servers can be grouped regionally, by applications that they run, by line of business, by groups within the line of business, etc. Employees within the business are tasked with managing the configurations of the servers or groups of servers, which includes reviewing, updating, and validating that the server settings are configured in the way that they are intended to be configured, and that they stay properly configured over time.

Unwanted changes to the configuration settings of the servers or applications that run on the servers can occur over time. The configuration setting changes can occur through human error, software updates, computer errors, unauthorized access, software code errors, hardware failure, data corruption, policy enforcement or lack thereof, etc. For example, most server service pack updates include notes regarding the configuration settings that are affected by the service pack, but they often affect other configuration settings without the knowledge of the support teams charged with uploading the service packs or the vendors that provide the service packs. Server configuration settings are also affected by active group policy changes or individual user changes without the knowledge of the support teams that are tasked with managing the servers.

The servers and applications running on the servers can have thousands, tens of thousands, hundreds of thousands, etc. of associated configuration settings. Therefore, when two servers or groups of servers need to be set up with the same or similar configurations the only way to set the configurations is to set up both systems and hope that no mistakes were made. There is no way to check that the initial set up or following updates to the configuration settings were made correctly, and that the configuration settings are maintained over time. Moreover, there is no way to know what all the configuration settings are at any given point in time, without viewing thousands of configuration settings on a line by line basis. The only way support teams become aware of configuration setting issues is if the applications or systems used by the businesses are not functioning properly, in which case valuable time is lost during the application and system outages while the support team tries to identify the system or application issues and fix them.

There are challenges in being able to quickly identify the configuration settings of servers and the associated applications and how they change over time. Therefore, there is a need for apparatuses and methods for effectively allowing the support team to monitor, update, validate, and maintain the configuration settings for specific servers and groups of servers within the business.

BRIEF SUMMARY

Embodiments of the present invention address the above needs and/or achieve other advantages by providing apparatuses (e.g., a system, computer program product, and/or other device) and methods for effectively allowing a support team to monitor, update, validate, and maintain the configuration settings for specific servers and groups of servers within a business.

Embodiments of the present invention provide systems and methods for allowing a user (e.g., an employee or support team) to define the settings and reference values (hereinafter "configuration settings") that the user wants to capture from one or more servers and applications that run on the servers (hereinafter "servers"). The user can capture the configuration settings for a server (hereinafter "snapshot") using a configuration management application. The first time the configuration settings of a server are captured for an associated configuration schema, the configuration settings will be the baseline configuration settings (hereinafter "baseline snapshot"). The baseline snapshot can then be assigned to the configuration schema in order to act as a reference for future snapshots (hereinafter "reference snapshot"). At a later point in time, the system accesses each defined server and retrieves the actual configuration settings ("current snapshot"). The current snapshot can be compared to the reference snapshot for the purposes of monitoring, updating, validating, and maintaining the configuration settings of one or more servers. The user can also choose to have the current snapshot be the new reference snapshot, in order to act as a reference for future current snapshots. The system also provides reports that allow the user to analyze the differences in configuration settings over time. The reports allow the user to identify any configuration changes that need to be implemented, in some cases before any server outages occur, which can lead to lost time and resources that affect the bottom line of the business's balance sheets.

One embodiment of the invention is a method comprising capturing a reference snapshot of a first plurality of configuration settings for a first server; capturing a current snapshot of a second plurality of configuration settings for a second server; and determining, using a processing device, differences between the first plurality of configuration settings in the reference snapshot with the second plurality of configuration settings in the current snapshot.

In further accord with an embodiment of the invention, the method further comprises assigning a configuration schema to a first server; and wherein capturing the reference snapshot of the first plurality of configuration settings for a first server comprises following the configuration schema assigned to the first server.

In another embodiment of the invention the method comprises assigning a configuration schema to the second server; and wherein capturing the current snapshot of the second plurality of configuration settings for the second server comprises following the configuration schema assigned to the second server. In yet another embodiment of the invention the method further comprises assigning the reference snapshot to the configuration schema.

In further accord with an embodiment of the invention the method further comprises identifying the first server from which to take the reference snapshot of the first plurality of configuration settings.

In another embodiment of the invention the method further comprises creating a configuration schema; and assigning the configuration schema to the first server or the second server to capture the first plurality of configuration settings or the second plurality of configuration settings.

In yet another embodiment of the invention the method further comprises assigning a plurality of configuration items to the configuration schema describing where to capture the first plurality of configuration settings or the second plurality of configuration settings.

In further accord with an embodiment of the invention the first server and the second server are the same server. In another embodiment of the method the first server and the second server are different servers.

In yet another embodiment of the invention the method further comprises the steps of capturing a reference snapshot of a third plurality of configuration settings for a first server; capturing a current snapshot of a fourth plurality of configuration settings for a second server; and determining differences between the third plurality of configuration settings in the reference snapshot with the fourth plurality of configuration settings in the current snapshot. In further accord with an embodiment of the invention the differences are new settings, changed settings, or missing settings.

In another embodiment of the invention the method further comprises creating a report illustrating differences identified between the first plurality of configuration settings in the reference snapshot with the second plurality of configuration settings in the current snapshot.

In yet another embodiment of the invention the method further comprises identifying an excluded configuration setting; and excluding the excluded configuration setting from the report.

In still another embodiment of the invention the differences between the first plurality of configuration settings in the reference snapshot and the second plurality of configuration settings in the current snapshot are illustrated by displaying values or nomenclature for the differences identified.

In further accord with an embodiment of the invention the reference snapshot is a baseline snapshot.

In yet another embodiment of the invention the method further comprises creating a report illustrating an error encountered in capturing at least one configuration setting.

Another embodiment of the invention is a system comprising a memory device and a processing device. The memory device has computer readable program code store thereon. The processing device is operatively coupled to the memory device, and is configured to execute the computer readable program code for capturing a reference snapshot of a first plurality of configuration settings for a first server. The processing device is further configured to execute the computer readable program code for capturing a current snapshot of a second plurality of configuration settings for a second server. The processing device is further configured to execute the computer readable program code for determining differences between the first plurality of configuration settings in the reference snapshot with the second plurality of configuration settings in the current snapshot.

In further accord with an embodiment of the invention the processing device is further configured to execute the computer readable program code for assigning a configuration schema to a first server; and wherein capturing the reference snapshot of the first plurality of configuration settings for a first server comprises following the configuration schema assigned to the first server.

In another embodiment of the invention the processing device is further configured to execute the computer readable program code for assigning a configuration schema to the second server; and wherein capturing the current snapshot of the second plurality of configuration settings for the second server comprises following the configuration schema assigned to the second server.

In yet another embodiment of the invention the processing device is further configured to execute the computer readable program code for assigning the reference snapshot to the configuration schema.

In still another embodiment of the invention the processing device is further configured to execute the computer readable program code for identifying the first server from which to take the reference snapshot of the first plurality of configuration settings.

In further accord with an embodiment of the invention the processing device is further configured to execute the computer readable program code for creating a configuration schema; and assigning the configuration schema to the first server or the second server to capture the first plurality of configuration settings or the second plurality of configuration settings.

In another embodiment of the invention the processing device is further configured to execute the computer readable program code for assigning a plurality of configuration items to the configuration schema describing where to capture the first plurality of configuration settings or the second plurality of configuration settings.

In yet another embodiment of the invention the first server and the second server are the same server. In still another embodiment of the invention the first server and the second server are different servers.

In further accord with an embodiment of the invention the processing device is further configured to execute the computer readable program code for capturing a reference snapshot of a third plurality of configuration settings for a first server. The processing device is further configured to execute the computer readable program code for capturing a current snapshot of a fourth plurality of configuration settings for a second server. The processing device is further configured for determining differences between the third plurality of configuration settings in the reference snapshot with the fourth plurality of configuration settings in the current snapshot. In another embodiment of the invention the differences are new settings, changed settings, or missing settings.

In yet another embodiment of the invention the processing device is further configured to execute the computer readable program code for creating a report illustrating differences identified between the first plurality of configuration settings in the reference snapshot with the second plurality of configuration settings in the current snapshot.

In still another embodiment of the invention the processing device is further configured to execute the computer readable program code for identifying an excluded configuration setting; and excluding the excluded configuration setting from the report.

In further accord with an embodiment of the invention the differences between the first plurality of configuration settings in the reference snapshot and the second plurality of configuration settings in the current snapshot are illustrated by displaying values or nomenclature for the differences identified.

In another embodiment of the invention the reference snapshot is a baseline snapshot.

In yet another embodiment of the invention the processing device is further configured to execute the computer readable program code for creating a report illustrating an error encountered in capturing at least one configuration setting.

Another embodiment of the invention is a computer program product. The computer program product comprising at least one non-transitory computer-readable medium having computer-readable program code portions embodied therein.

The computer-readable program code portions comprise an executable portion configured for capturing a reference snapshot of a first plurality of configuration settings for a first server. The computer-readable program code portions further comprise an executable portion configured for capturing a current snapshot of a second plurality of configuration settings for a second server. The computer-readable program code portions further comprise an executable portion configured for determining differences between the first plurality of configuration settings in the reference snapshot with the second plurality of configuration settings in the current snapshot.

In further accord with an embodiment of the invention the computer-readable program code portions further comprise an executable portion configured for assigning a configuration schema to a first server; and wherein the executable portion configured for capturing the reference snapshot of the first plurality of configuration settings for a first server comprises following the configuration schema assigned to the first server.

In another embodiment of the invention the computer-readable program code portions further comprise an executable portion configured for assigning a configuration schema to the second server; and wherein the executable portion configured for capturing the current snapshot of the second plurality of configuration settings for the second server comprises following the configuration schema assigned to the second server.

In yet another embodiment of the invention the computer-readable program code portions further comprise an executable portion configured for assigning the reference snapshot to the configuration schema.

In still another embodiment of the invention the computer-readable program code portions further comprise an executable portion configured for identifying the first server from which to take the reference snapshot of the first plurality of configuration settings.

In further accord with an embodiment of the invention the computer-readable program code portions further comprise an executable portion configured for creating a configuration schema; and an executable portion configured for assigning the configuration schema to the first server or the second server to capture the first plurality of configuration settings or the second plurality of configuration settings.

In another embodiment of the invention the computer-readable program code portions further comprise an executable portion configured for assigning a plurality of configuration items to the configuration schema describing where to capture the first plurality of configuration settings or the second plurality of configuration settings.

In yet another embodiment the first server and the second server are the same server. In still another embodiment of the invention the first server and the second server are different servers.

In further accord with an embodiment of the invention the computer-readable program code portions further comprise an executable portion configured for capturing a reference snapshot of a third plurality of configuration settings for a first server. The computer-readable program code portions further comprise an executable portion configured for capturing a current snapshot of a fourth plurality of configuration settings for a second server. The computer-readable program code portions further comprise an executable portion configured for determining differences between the third plurality of configuration settings in the reference snapshot with the fourth plurality of configuration settings in the current snapshot.

In another embodiment of the invention the differences are new settings, changed settings, or missing settings.

In yet another embodiment of the invention the computer-readable program code portions further comprise an executable portion configured for creating a report illustrating differences identified between the first plurality of configuration settings in the reference snapshot with the second plurality of configuration settings in the current snapshot.

In still another embodiment of the invention the computer-readable program code portions further comprise an executable portion configured for identifying an excluded configuration setting; and an executable portion configured for excluding the excluded configuration setting from the report.

In further accord with an embodiment of the invention the differences between the first plurality of configuration settings in the reference snapshot and the second plurality of configuration settings in the current snapshot are illustrated by displaying values or nomenclature for the differences identified.

In another embodiment of the invention the reference snapshot is a baseline snapshot.

In yet another embodiment of the invention the computer-readable program code portions further comprise an executable portion configured for creating a report illustrating an error encountered in capturing at least one configuration setting.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
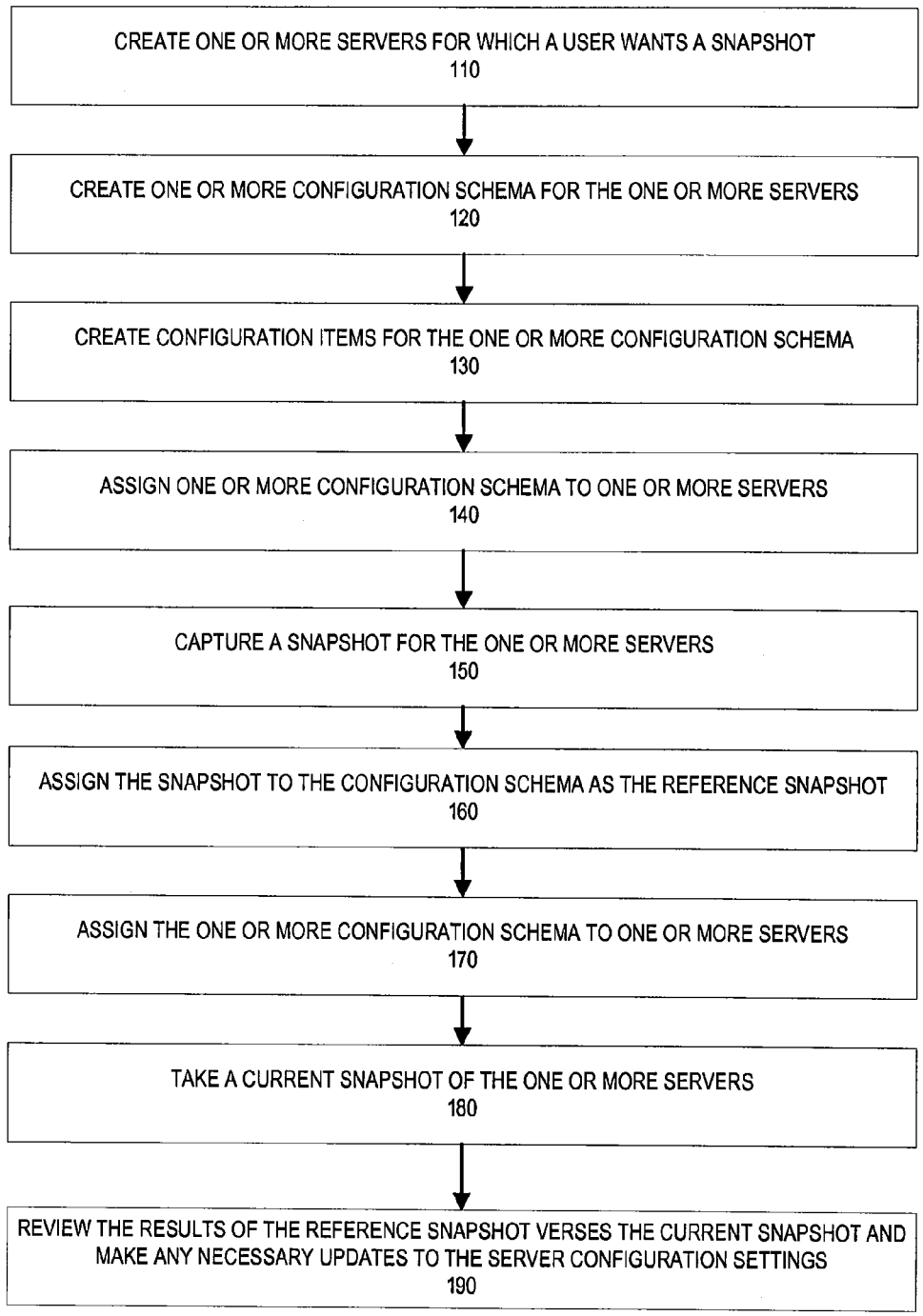
Figure 2:
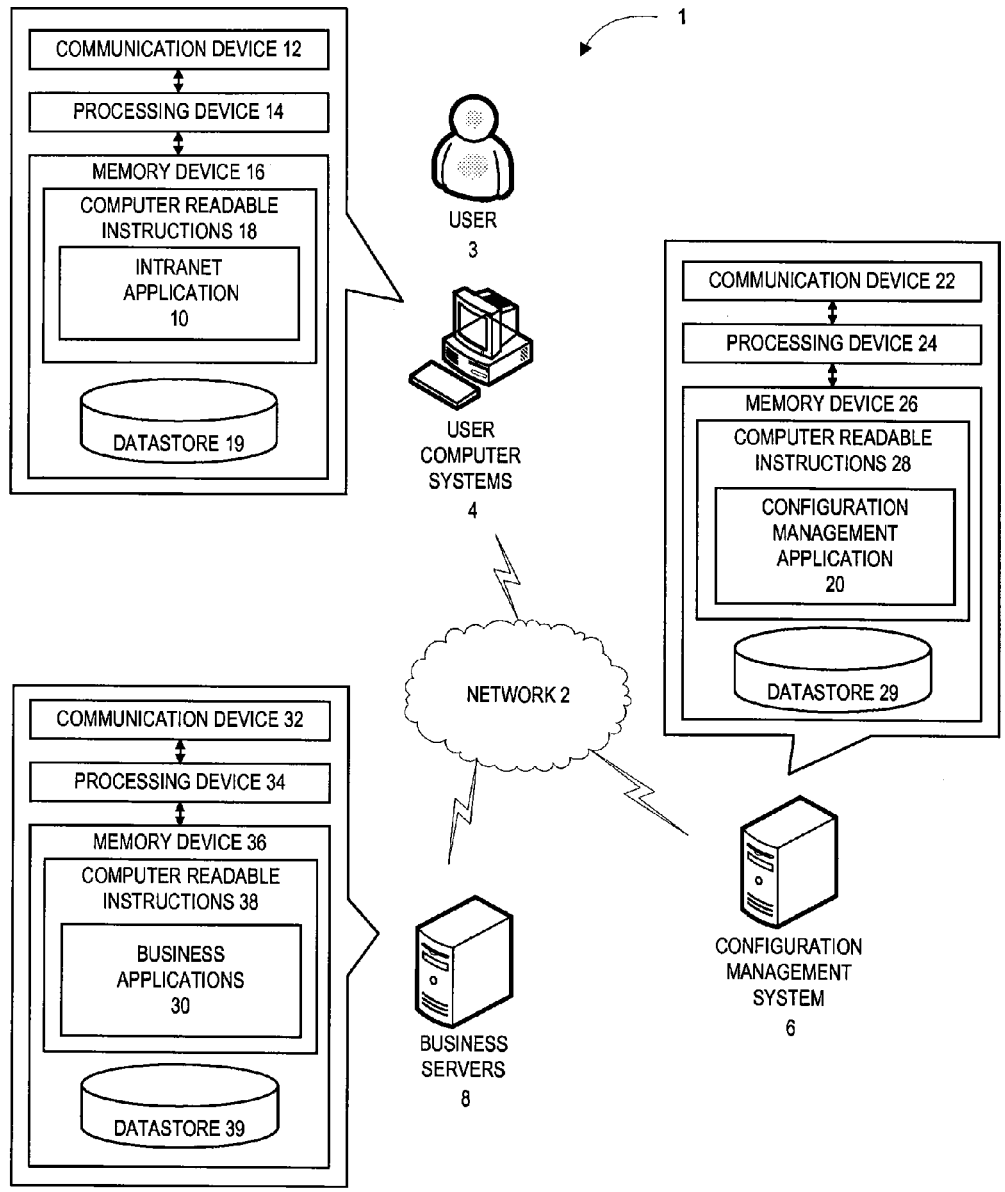
Figure 3:
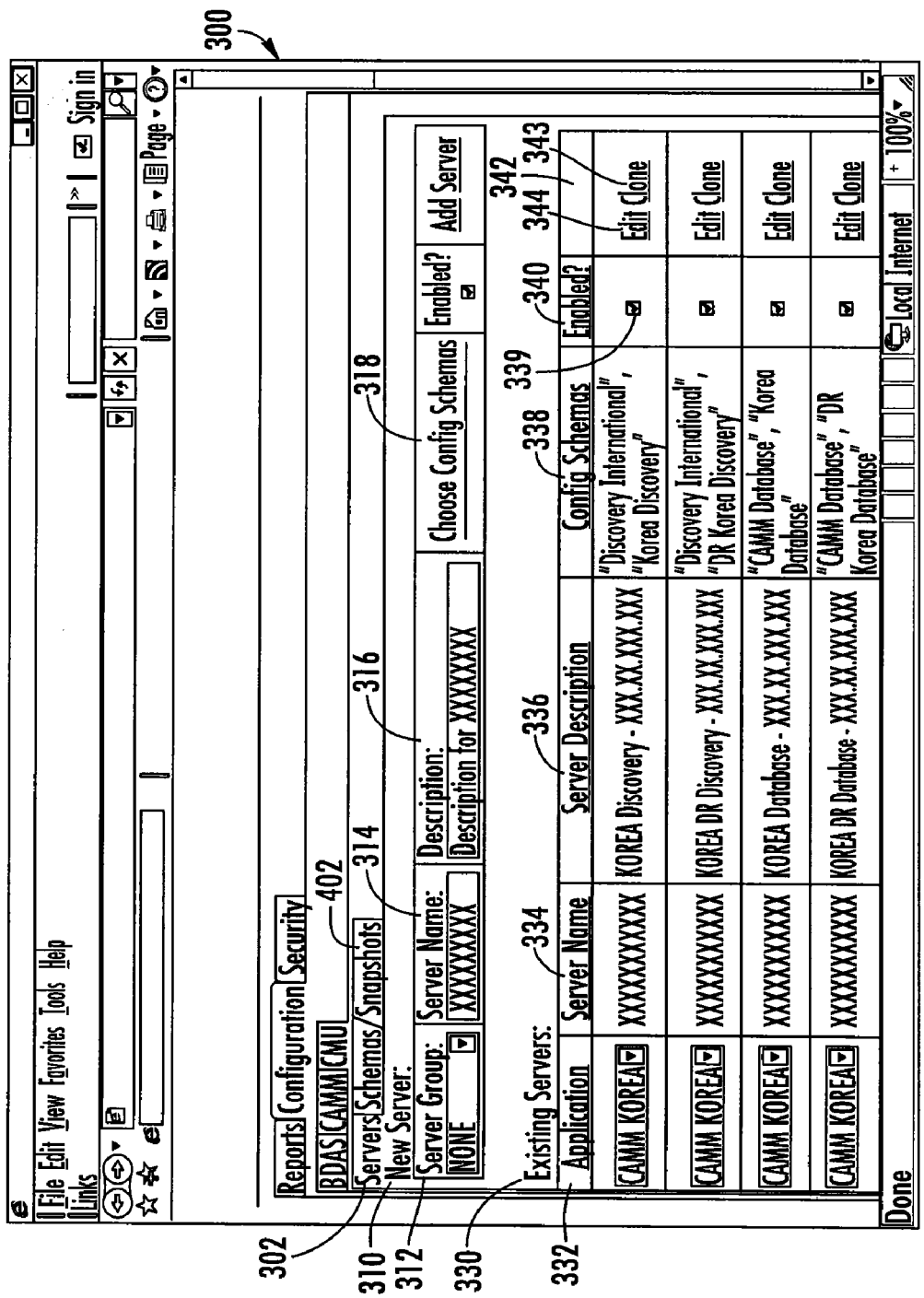
Figure 4:
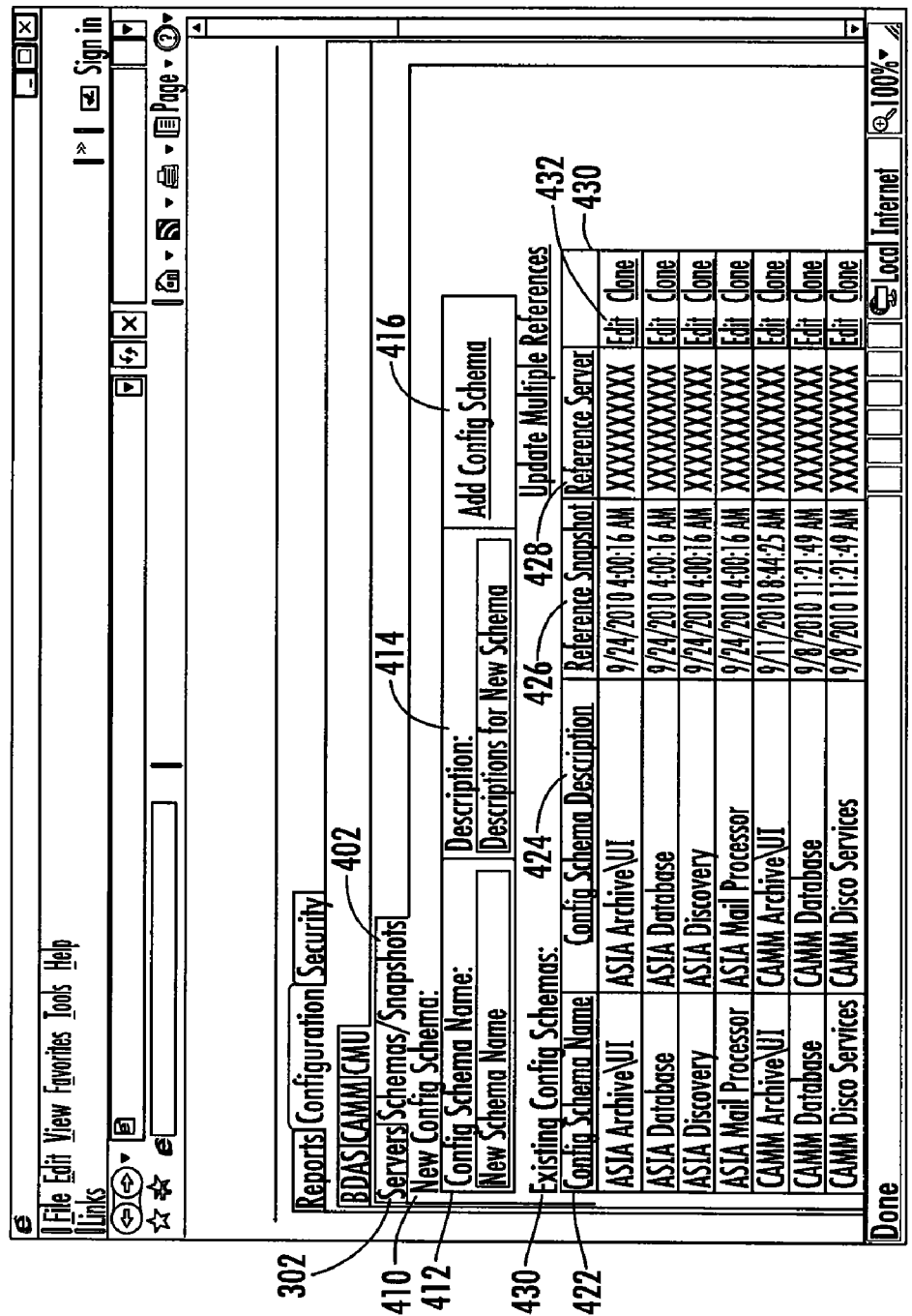
Figure 5:
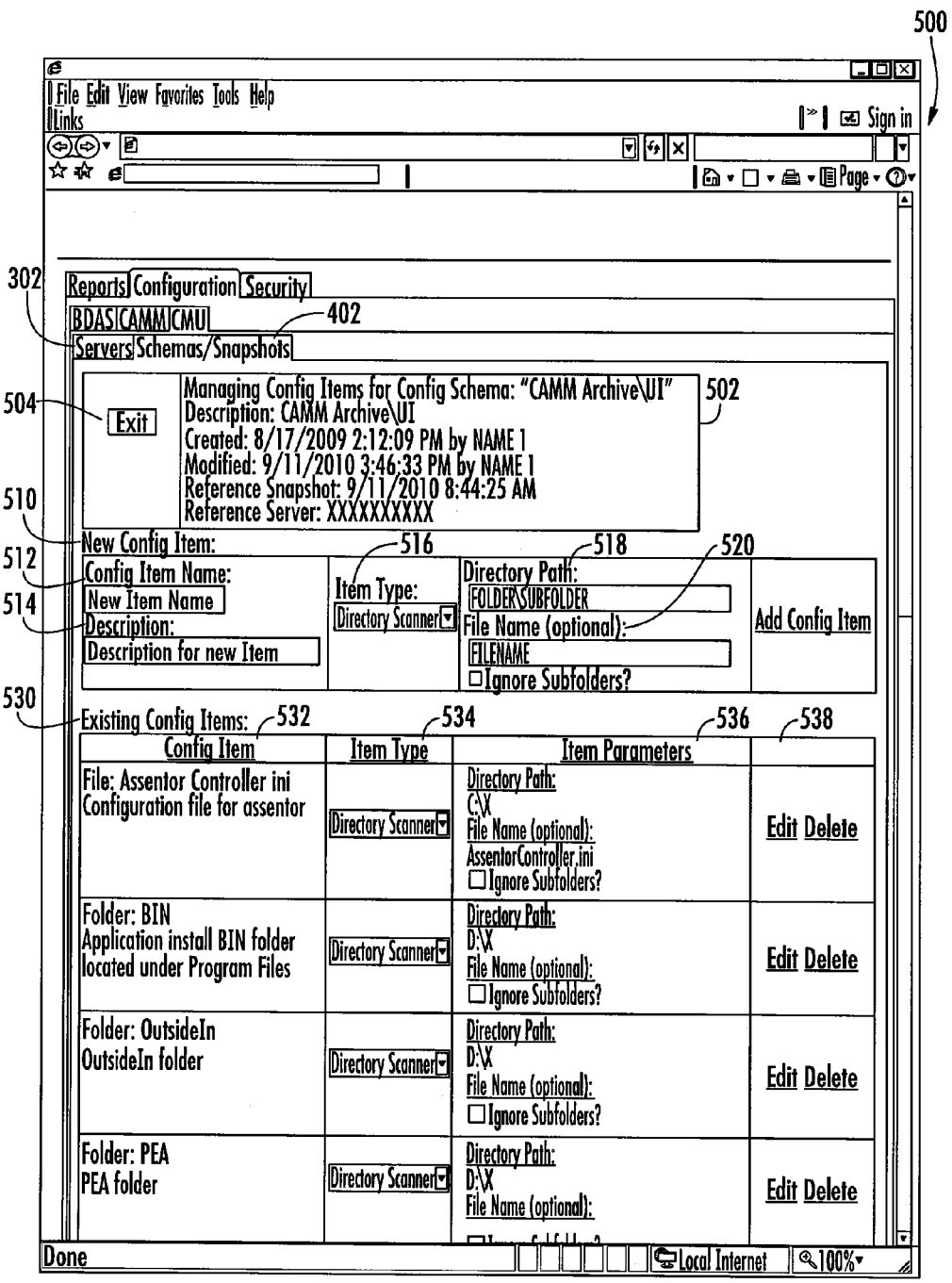
Figure 8:
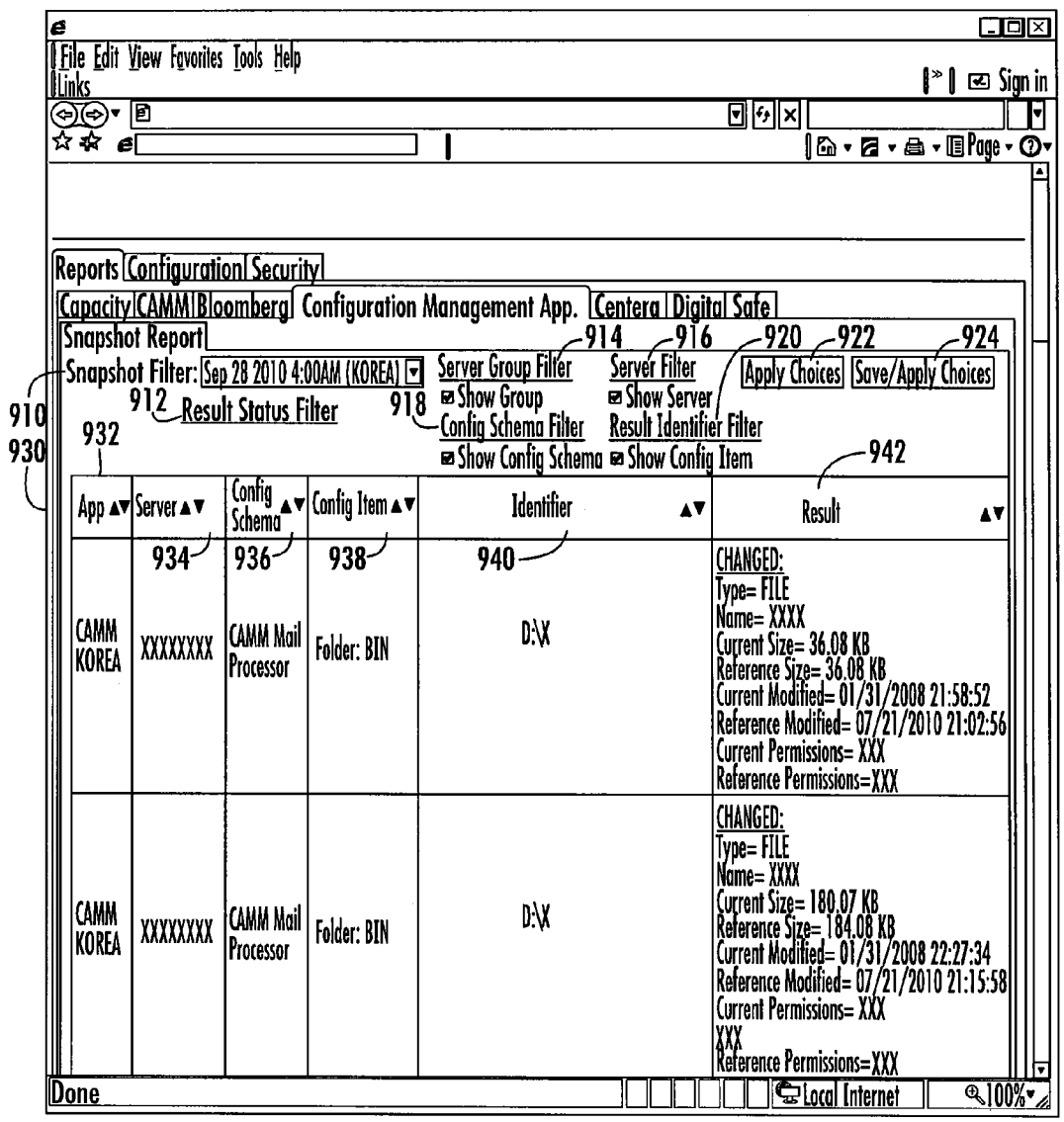
Figure 9:
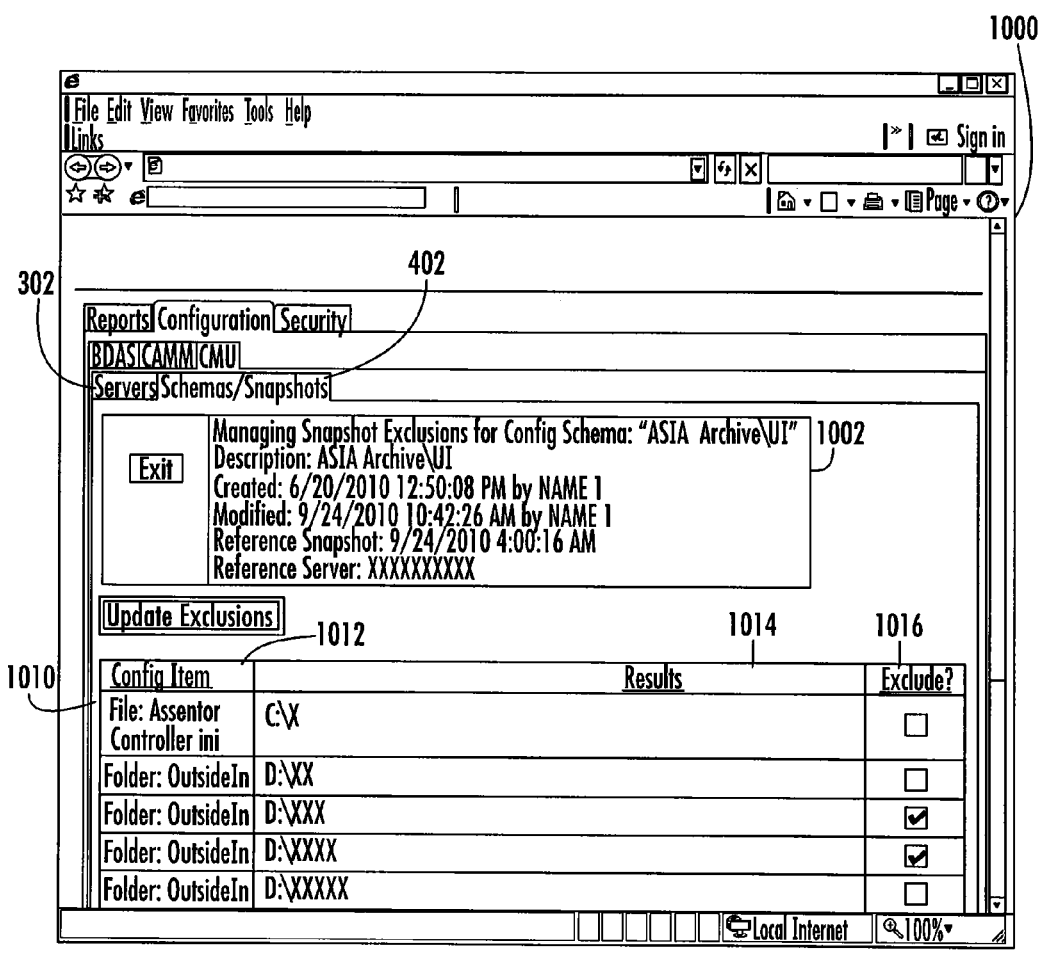

Having thus described embodiments of the invention in general terms, reference will now be made to the accompanying drawings, which are not necessarily drawn to scale, and wherein:

FIG. 1 provides a flow diagram outlining the process for configuration management of one or more servers within a business, in accordance with one embodiment of the invention;

FIG. 2 provides a system environment diagram illustrating a configuration management system within a business, in accordance with one embodiment of the invention;

FIG. 3 provides a configuration management interface for creating new servers and assigning configuration schema to the servers, in accordance with one embodiment of the invention;

FIG. 4 provides a configuration management interface for creating new configuration schema and assigning reference snapshots to the configuration schema, in accordance with one embodiment of the invention;

FIG. 5 provides a configuration management interface for assigning configuration items to the configuration schema, in accordance with one embodiment of the invention;

FIG. 6 provides a report e-mail for validating the configuration settings of a server, in accordance with one embodiment of the invention;

FIG. 7 provides a detailed results report for validating the configuration settings of a server, in accordance with one embodiment of the invention;

FIG. 8 provides a configuration management interface for reviewing reports regarding the configuration settings of servers, in accordance with one embodiment of the invention; and FIG. 9 provides a configuration management interface for creating exceptions for the configuration settings.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As illustrated in FIG. 1, the configuration management process 100 generally comprises creating a configuration schema; creating configuration items to assign to the configuration schema; assigning the configuration schema to one or more servers in the business; capturing a snapshot of the configuration settings for a server based on the configuration schema and assigning it to the configuration schema as the reference snapshot; capturing a current snapshot of the actual configuration settings for one or more servers; and comparing the reference snapshot with the current snapshot to determine the differences in the configuration settings. The configuration management process 100 will be explained in further detail throughout this patent, but first the configuration management system and application is described generally.

In some embodiments of the invention there are a plurality of different configuration schemas that can be used to check the configuration settings of one or more servers or group of servers. A server group is a categorization that allows one or more servers to be associated with a given server group. A server is a computing system that runs at least part of one or more applications within a business. A configuration schema is defined as a collection of configuration items that are used to define a set of configuration settings to monitor for one or more servers. A configuration item is a defined setting with associated parameters that allows the configuration management application to identify the locations from which it captures the configuration settings of one or more servers. The configuration items have associated configuration item types, which describe the type of configuration setting that the configuration management application is capturing. A snapshot is a data file that captures all of the configuration settings that are defined for a particular configuration schema. A reference snapshot is a snapshot that has been assigned to a configuration schema in order to act as a reference to compare against future snapshot. The current snapshot is a snapshot that is taken at a particular point in time and compared with the reference snapshot, in order to identify any differences between the current and reference configuration settings over time. For the sake a clarity the current snapshot does not have to be the most up to date snapshot. The current snapshot can be a snapshot that occurred in the previous hour, day, week, etc, but in most embodiments the current snapshot occurs after the references snapshot for which it is being compared against.

FIG. 2 illustrates a configuration management system environment 1, in accordance with an embodiment of the present invention. As illustrated in FIG. 1, the user computer systems 4 are operatively coupled, via a network 2 to the configuration management system 6, and the business servers 8. In this way, the user 3 can access the configuration management application 20 and interfaces for managing the configuration settings of the business servers 8. The user 3, in some embodiments of the invention, is an employee of the business who is tasked with reviewing, updating, validating and maintaining the configuration settings of the business servers 8 within the business. In other embodiments of the invention the user 3 is an agent, contractor, support team, or other person or group of people designated to act on behalf of the business. The network 2 may be a global area network (GAN), such as the Internet, a wide area network (WAN), a local area network (LAN), an intranet or any other type of network or combination of networks. The network 2 may provide for wireline, wireless, or a combination of wireline and wireless communication between devices on the network 2.

As illustrated in FIG. 2, each user computer system 4 generally comprises a communication device 12, a processing device 14, and a memory device 16. In some embodiments of the invention the user computer systems 4 can be a stand alone system or part of another system that is also operatively connected through the network 2. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 14 is operatively coupled to the communication device 12, and the memory device 16. The processing device 14 uses the communication device 12 to communicate with the network 2, and other devices on the network 2, such as, but not limited to, the configuration management system 6 and the business servers 8. Furthermore, the user computer systems 4 can be located at various sites throughout the business and can communicate with each other, as well as with other systems and devices over the network 2. As such, the communication device 12 generally comprises a modem, server, or other device for communicating with other devices on the network 2, and a display, camera, keypad, mouse, keyboard, microphone, and/or speakers for communicating with one or more users 3.

As further illustrated in FIG. 1, the user computer system 4 comprises computer-readable instructions 18 stored in the memory device 16, which in one embodiment include the computer-readable instructions 18 of an intranet application 10. In some embodiments, the memory device 16 includes a datastore 19 for storing data related to the user computer systems 4, including but not limited to data created and/or used by the intranet application 10. The intranet application 10 allows the user 3 to connect to and access the configuration management system 6 and the business servers 8, in order to send and receive information about the configuration settings of the business servers 8. In other embodiments of the invention the intranet application 10 can be an Internet application or other type of application that allows the user 3 to connect to and access the configuration management system 6 and the business servers 8.

As further illustrated in FIG. 1, the configuration management system 6 comprises a communication device 22, a processing device 24, and a memory device 26. The processing device 24 is operatively coupled to the communication device 22 and the memory device 26. The processing device 24 uses the communication device 22 to communicate with the network 2, and other devices on the network 2 such as, but not limited to, the user computer systems 4 and the business servers 8. As such, the communication device 22 generally comprises a modem, server, or other device(s) for communicating with other devices on the network 2.

As illustrated in FIG. 1, the configuration management system 6 comprises computer-readable program instructions 28 stored in the memory device 26, which in one embodiment includes the computer-readable instructions 28 of a configuration management application 20. In some embodiments, the memory device 26 includes a datastore 29 for storing data related to the configuration management system 6, including but not limited to data created and/or used by the configuration management application 20. The configuration management application 20 allows a user 3 to monitor, update, validate, and maintain the configuration settings of the business servers 8 within the business.

As further illustrated in FIG. 1, each business server 8 generally comprises a communication device 32, a processing device 34, and a memory device 36. The processing device 34 is operatively coupled to the communication device 32 and the memory device 36. The processing device 34 uses the communication device 32 to communicate with the network 2, and other devices on the network 2, such as, but not limited to, the user computer systems 4 and the configuration management system 6. As such, the communication device 32 generally comprises a modem, server, or other device(s) for communicating with other devices on the network 2.

As illustrated in FIG. 1, the business servers 8 comprise computer-readable program instructions 38 stored in the memory device 36, which in one embodiment includes the computer-readable instructions 38 of the business applications 30. In some embodiments, the memory device 36 includes a datastore 39 for storing data related to the business servers 8, including but not limited to data created and/or used by the business applications 30. The business applications 30 allow the business to run the day to day operations of the business, and, thus, the business applications 30 and business servers 8 must be functioning properly for the business to continue its operations in an efficient manner.

It will be understood that systems, devices, servers, processors, computers, networks, and other devices described herein may be made up of one system, device, server, processor, computer, network, etc., or numerous systems, devices, servers, processors, computers, networks, etc. working in conjunction with each other. Also, it is to be understood that use of the term computer system includes, but is not limited to, desktop, laptop, smart phone, personal display device (PDA), televisions with network access, or any other electronic system that has a communication device, processing device, and memory device.

It is understood that, in some embodiments of the invention, the configuration management system 6 can be run as a centralized system through which the configuration management application 20 accesses every server in the business. In other embodiments of the invention, the configuration management system 6 can be run as a distributed system in which there are multiple configuration management systems 6 and/or configuration management applications 20 run for server groups that are split into regions, applications, lines of business, etc. For example, a distributed configuration management application 20 may be configured to only capture configuration setting snapshots of the server group or specific servers for which it is responsible.

A configuration schema is generally linked to a single type of server within a server group, but configuration schema can also be useful for checking global settings that exist on one or more servers, potentially having distinct application roles, throughout the business. A server group allows one or more servers that have common configuration settings to be linked together for purposes of checking similar configuration settings or for reporting the configuration settings of linked servers. For example, in some embodiments a server group can comprise of a plurality of servers that are running the same application and thus need to have the same or similar configuration settings. In other embodiments a server group can comprise of a plurality of servers with similar application roles but are located in distinct geographic region and thus may have some configuration settings that overlap and/or other configuration settings that are region specific.

FIGS. 3 through 9 illustrate the configuration management interfaces and reports that allow the users 3 within the business to manage the configuration settings of the business servers 8. The configuration management interfaces and reports are discussed throughout this application with respect to the configuration management process 100 illustrated in FIG. 1.

As illustrated by block 110 in FIG. 1, the first step in the configuration management process is to create a server group comprising one or more servers for which the user 3 wants to manage. FIG. 3, illustrates a server assignment interface 300. The server assignment interface 300 is used to create new servers and match the new servers and/or existing servers with configuration schemas in order to tell the configuration management application 20 what configuration settings to identify on each server. To create a new server a user 3 enters information into the new server section 310 of the server assignment interface 300. The user 3 enters a server group 312 for the server, a server name 314, and a server description 316. The server group, as previously explained can be a group of one or more servers that are linked through one or more traits, such as but not limited to applications they run, geographic regions they support, etc. In some embodiments, as illustrated in FIG. 3, the servers can be identified by server name. In other embodiments the server internet protocol ("IP") address can be used to indentify the proper server, while in still other embodiments other server identifying information can be used to identify the proper server. The server description 316 is a summary of the server, which is helpful to users 3 in identifying the selected server in the future.

After creating a new server, the user can assign a configuration schema to the new server by selecting the choose configuration schema link 318. However, in some embodiments the correct schema may not exist. Therefore, the user 3 may first need to create one or more configuration schema for the one or more servers, as illustrated in block 120 of FIG. 1. The user 3 can select the schema/snapshot tab 402 in order to view the configuration schema interface 400, which is illustrated in FIG. 4. This interface allows a user 3 to create and modify the existing configuration schemas. The configuration schema is an outline for telling the configuration management application 20 which configuration settings to identify on one or more servers. In order to create a configuration schema, the user 3 enters information into the new configuration schema section 410. As illustrated in the new configuration schema section 410, the user enters a new configuration name 412 and a new configuration description 414. The user 3 can select the add configuration schema link 416 to add the new configuration schema to the existing configuration schema list in the existing configuration schema section 430.

After the user 3 creates a new configuration schema, the user 3 associates configuration items with the configuration schema, as illustrated by block 130 in FIG. 1. Without adding the configuration items the configuration management application 20 may not know what configuration settings to search for when running a snapshot using the configuration schema. After selecting the edit link 432 in the edit column 430 of FIG. 4, the configuration management application 20 displays the configuration item interface 500, as illustrated in FIG. 5. The configuration items, as previously explained tell the configuration management application 20 the locations and types of configuration settings that the user 3 wants the configuration management application 20 to identify on a server. The configuration item interface 500 has a configuration schema information section 502, which describes the configuration schema to which the configuration items will be added. In the illustrated embodiment the configuration schema information section 502 lists the name of the configuration schema, a description of the configuration schema, the date created, the date modified, the reference snapshot, and the reference server from which the snapshot was taken. In some embodiments of the invention the configuration schema information section 502 will not include the reference snapshot and reference server if a snapshot has not been taken or assigned to the particular configuration schema.

To add a configuration item to the configuration schema listed in the configuration schema information section 502, the user 3 creates a new configuration item in the configuration item section 510. The user 3 enters the configuration item name 512 as well as a configuration item description 514. The user 3 also assigns an item type 516. The configuration item type, in some embodiments can include the registry path or key, the directory or file, the INI file content (which is a file name extension for configuration files that stands for initialization), open database connectivity ("ODBC") settings, permissions (or access rights of users), simple mail transfer protocol ("SMTP"), internet information services ("IIS") setup, $3^{rd}$ party service configurations, etc. When the item type is a directory, the user 3 assigns either a directory path 518 and/or a file name 520. The directory path and/or file name directs the configuration management application 20 to the folders and files for which the user 3 wants the configuration management application 20 to capture the configuration settings. In either case the user 3 can have the configuration management application 20 also take a snapshot of any subfolders under the selected directory path 518 and/or file name 520. Again, the configuration item is used for indicating to the configuration management application 20 what folders and files to identify, using a directory path 518 and/or file name 520, and to identify the existing configuration settings contained within the directory path 518 and/or file name 520. The user 3 adds the new configuration item to the chosen configuration schema by selecting the add configuration item link 522. The new configuration item will appear in the existing configuration item section 530.

The existing configuration items section 530 lists the configuration items already assigned to the particular configuration schema. As illustrated in FIG. 5, the existing configuration items section 530 comprises the configuration item column 532, the item type column 534, the item parameters column 536, and an edit column 538. The configuration item column 532 illustrates the file name and description for the configuration item. The item type column 534 illustrates the item type of the configuration item. The item parameters column 536 lists the directory path and/or the file name that the configuration management application 20 will search within for the configuration settings. The edit column 538 allows the user 3 to edit any of the information for an existing configuration item listed in the existing configuration item section 530. Assigning configuration items to configuration schema using directory paths 518 and/or file names 520 allows the user 3 to tell the configuration management application 20 to search for thousands of configuration settings while only having to input a few configuration items because of the ability to include the subfolders along with the item parameter settings. The user 3 selects the ignore subfolders box 540 if the user 3 does not want to include the subfolders for a particular configuration item. The item parameter options may change based on the item type selected. For example, as illustrated in FIG. 5 for a directory scanner type, the item parameters are directory path 518 and/or file name 520. However, if the registry scanner is selected as the item type, the item parameters inputs may change to a registry path and/or a registry key name. Once the user 3 has listed all of the configuration items that the user 3 wants for the particular configuration schema listed in the configuration schema information 502 section, the user 3 can select the exit button 504 and return to the configuration management interfaces.

After the user 3 has created a new configuration schema the user 3 may have to assign one or more configuration schema to one or more servers as illustrated by block 140 in FIG. 1. As illustrated in the existing server section 330 of FIG. 3, the user 3 can assign a configuration schema to a server group and/or server. The existing server section 330 has a server group column 332, a server name column 334, server description column 336, configuration schema column 338, enabled column 340, and an edit column 342. The enabled column 340 allows servers to be dynamically included or excluded from snapshot execution by the configuration management application 20, which can be useful if servers need to be taken offline for a period of time. The configuration management application 20 has the ability to identify that the server is disabled when the enabled box 339 is not selected, and thus, will not report the server as being improperly configured when a snapshot is taken of the disabled server. The user 3 can select the edit link 344 in the edit column to make changes to the existing servers through dropdown menus. For example, the user 3 can assign the configuration schemas "discovery international" and "Korea Discovery" to the server name ASISELGAP11, using the edit link 344 and drop-down menus.

As illustrated by block 150 in FIG. 1, the user 3 then schedules the configuration management application 20 to run at specified time(s), in order to capture a snapshot of the configuration settings for the server. In other embodiments of the invention, the user 3 can select a run button in order to tell the configuration management application 20 to capture a snapshot immediately. Regardless of how the configuration management application 20 is activated to capture a snapshot, in one embodiment of the invention, the configuration management application 20 located on the configuration management system 6 accesses one of the business servers 8 through the use of its communication device 22 via the network 2. The configuration management application 20 then accesses the memory device 36 of the business server 8. Thereafter, the configuration management application 20 identifies and captures the configuration settings for at least part of the server or the entire server, which are identified based on the configuration items that were assigned to the configuration schema that was assigned to the server. The captured configuration settings of the configuration schema, along with the date and time they were captured, are then stored in the memory device 26 of the configuration management system 6 as a snapshot of the configuration settings of the business server 8 for a particular time and day.

In some embodiments, in the case of a new server or configuration schema that does not have any previous associated snapshots, the configuration management application 20 identifies the baseline snapshot, which captures all of the baseline configuration settings for the configuration schema. This baseline snapshot can then be used as the reference snapshot. In some embodiments, such as in the case of a server that has a previous associated snapshot or a configuration schema that has been previously used to take a snapshot that has been defined as the reference snapshot, the configuration management application 20 may only store the differences between the previous snapshot (i.e., the reference snapshot) and the current snapshot. However, the user 3 may select the current snapshot as the new reference snapshot and the configuration management application 20 can identify the new reference snapshot because the configuration settings from the previous reference snapshot can be combined with the differences identified in the current snapshot, to capture all of the configuration settings for the new reference snapshot.

At some point after the reference snapshot is captured, the user 3 may want to check to see if any of the configuration settings for the server or group of servers has changed by comparing a new snapshot with the reference snapshot. In other embodiments, the user 3 may want to check a server that was just updated against another server for which the reference snapshot was taken because the servers should have the same configuration settings. As illustrated by block 160 in FIG. 1, the user 3 can assign the new reference snapshot that the configuration management application 20 captured, as described in block 150 of FIG. 1, to the associated configuration schema through the configuration schema interface 400 illustrated in FIG. 4. The user 3 edits the existing configuration schema section 420 in FIG. 4 to assign the proper reference snapshot to the configuration schema using the edit link 432 in the edit column 430.

As illustrated in the existing configuration schema section 420 of FIG. 4, the configuration schema name column 422 displays the name of existing schemas created by the user 3. The configuration schema description column 424 is the summary entered by the user 3 in the new configuration schema description 414. The existing configuration schema section 420 also has a reference snapshot column 426, which displays the existing reference snapshot time and date stamp indicating when the reference snapshot of the configuration settings was taken for the associated configuration schema. The reference server column 428 indicates on which server the reference snapshot came from. These columns indicate what the configuration management application 20 is using as the reference snapshot for the configuration schema, the date and time the reference snapshot was taken, and the server from which it was taken.

In order to choose a specific reference snapshot for the associated configuration schema name, the user 3 selects the edit link 432 in the edit column 430. A drop down selection appears that allows the user 3 to select as the reference snapshot any snapshot taken of any server within the business captured in the past using the associated configuration schema. In some embodiments of the invention, the user 3 not only selects a snapshot, but the user 3 may also select a server associated with the particular reference snapshot. For example, if there are a group of servers that all have the same role, they are generally all going to be associated with same configuration schema, therefore, they all typically need to have the same configuration settings. If the user 3 selects a specific reference snapshot of the group of servers, the configuration management application 20 will not know what reference snapshot to use because there are multiple servers included in the snapshot. Therefore, in some embodiments, the user 3 must indicate the proper server as well as the snapshot in order to identify the reference snapshot.

As illustrated by block 170 in FIG. 1, the user 3 can select one or more configuration schema to assign to a server in a server group within the server interface 300. The configuration schemas column 338 lists one or more configuration schemas assigned to a server. As illustrated in FIG. 3, and previously explained, more than one configuration schema can be assigned to a specific server. For example, if there are two groups of servers that run an application, but the two groups of servers are located in different parts of the world, some of the configuration settings of the application should be the same across both locations. However, there are other parts of the configuration settings of either server that should be different, because, for example, the laws are different, or the time zones are different at the different locations. Therefore, a single server can be evaluated through single or multiple configuration schemas that are global or specific. In some embodiments of the invention, the two separate schemas may have overlapping configuration settings that are the same within both configuration schemas assigned to the server. In this way the configuration management application 20 may search for the same configuration items twice for two different configuration schemas. However, in some embodiments of the invention, any differences identified in overlapping snapshots may be identified and reported only once.

As illustrated in the enabled column 340, the user 3 can enable or disable the configuration schemas assigned to a server, which allows schemas to be dynamically included or excluded from snapshot execution by the configuration management application 20. This can be useful when adding new schemas in order to allow the settings to be finalized without risking premature execution of a snapshot against the schema.

As illustrated in the edit column 342 the user 3 can also edit the configuration schemas by adding or removing configuration schemas to the servers in the existing server section 330. In some embodiments of the invention, the user 3 can clone the configuration schemas assigned to one server to another server in the server assignment interface 300 by assigning the same configuration schema to a server that the user 3 had previously assigned to another server, using the clone link 343. Since schemas can contain dozens or more descriptive fields, the clone functionality allows for a "find/replace" text feature. Therefore, if there was a configuration schema full of items with the words "North America" in the descriptions for the configuration items, and the user 3 cloned the configuration schema, the configuration management application 20 could replace every instance of "North America" with "South America" and immediately have duplicate configuration schemas for two regions each with appropriate descriptions for each item.

As illustrated by block 180, after the configuration schema is assigned to the server, the user 3 takes a current snapshot of the server. Again, this can be done by scheduling a snapshot execution time for which to run the snapshot or by manually selecting a run snapshot feature in the configuration management application interfaces. In some embodiments of the invention, the configuration management application 20 located on the configuration management system 6 accesses at least one of the business servers 8 through the use of its communication device 22 via the network 2. The configuration management application 20 then accesses the memory device 36 of the business server 8. Thereafter, the configuration management application 20 identifies and captures the configuration settings for at least part of the server or the entire server, which are identified based on the configuration items that were assigned to the at least one configuration schema that was assigned to the server. The captured configuration settings of the configuration schema, along with the date and time they were captured, are then stored in the memory device 26 of the configuration management system 6 as the current snapshot of the configuration settings for a particular time and day.

As illustrated by block 190, the reference snapshot is compared against the current snapshot in order to identify any differences between the configuration settings of the two snapshots, which would indicate potential issues with the functions of the business servers 8. In some embodiments of the invention, the configuration management application 20 identifies each of the configuration settings and the associated values or nomenclature for the configuration settings in the reference snapshot. It then determines if the corresponding configuration settings exist in the current snapshot and if the associated value or nomenclature is the same. This can be done on a line by line basis. It then identifies any configuration settings in the current snapshot that were not compared with a configuration setting in the reference snapshot. In some embodiments this process can be done in reverse by first identifying the configuration settings and the associated values or nomenclature for the configuration settings in the current snapshot and comparing them with the configurations settings from the reference snapshot. As explained in further detail below during the comparison the configuration management application 20 determines if there are any new settings, changed settings, or missing settings between the reference snapshot and the current snapshot. The new settings are any new configurations settings in the current snapshot that were not found in the reference snapshot, or visa versa depending on how the comparison is made. The changed settings are any differences between the values or nomenclature found in the reference snapshot that were different from the current snapshot, or visa versa. The missing settings are any configuration settings in the reference snapshot that were not found the current snapshot, or visa versa.

FIG. 6 illustrates a snapshot execution report e-mail 700 which outlines the differences between a current snapshot and the associated reference snapshot. The snapshot execution report e-mail 700 lists a start timestamp 702 and a finish timestamp 704, which include the date and time the snapshot process began and ended. The snapshot execution report e-mail 700 also includes the baseline items 712, the new items 714, the changed items 716, the missing items 718, the errors encountered 720, the servers processed 722, and the configuration schemas processed 724. The baseline items 712 list the number of configuration settings in the snapshot if the particular configuration schema does not have a reference snapshot defined prior to execution. For example, if a user had just created a new configuration schema and directed the configuration management application 20 to identify the configuration settings on a server, then the baseline items 712 would include the total number of configuration settings that were identified on the server for the new configuration schema. Furthermore, if only schemas with no reference snapshots are included in the snapshot execution, every other number in the execution report e-mail 700 would illustrate a zero since there is no other snapshot to compare it against. Furthermore, if FIG. 6 illustrated a snapshot containing only baseline items, the results attached section 726 would read "no results attached" because there may be no reason to attach results when running a configuration schema for the purposes of creating the reference snapshot. The results file, as explained in further detail later, for a baseline snapshot would contain every or almost every configuration setting in the snapshot because it does not have another snapshot to use as a comparison. Therefore, there would be thousands, tens of thousands, or hundreds of thousands of configuration settings in the results file. In these cases the report may be of little value to a user 3 running the snapshot since the user 3 is most likely not going to look through each configuration setting.

Since the example snapshot execution report e-mail 700 illustrated in FIG. 6 only includes schemas that have an associated reference snapshot, the baseline items are zero. The new items 714, the changed items 716, the missing items 718, and the errors encountered 720 may have a number listed if there were differences found between the reference snapshot and the current snapshot. Again, the new items 714 list the number of configuration settings identified in the current snapshot that were not included in the reference snapshot. The changed items 716 list the number of configuration settings identified in the current snapshot that have different values than what was identified in the reference snapshot. The missing items 718 list the number of configuration settings not identified in the current snapshot that were a part of the reference snapshot.

The errors encountered 720 are the number of times the configuration management application 20 encountered an error when trying to identify configuration settings. For example, the user 3 may tell the configuration management application 20 to look at an "e-mail" configuration setting, which the user 3 spelled incorrectly when inputting the configuration item folder or file into the configuration schema. As a result, the snapshot execution report e-mail 700 may return one or more errors associated with identifying the e-mail configuration settings because it could not find the proper folder or file. Therefore, the errors encountered 720 let the user 3 know that errors occurred in the snapshot without impacting the results of the new items 714, changed items 716, and missing items 718 from the rest of the comparison between the reference snapshot and the current snapshot or other comparisons between other references snapshots and current snapshots running at the same time.

The servers processed 722 metric and the configuration schemas processed 724 metric indicate the number of servers processed and the number of configuration schemas used to process those servers. In some embodiments, there could be eight servers processed and only one schema processed if all of the servers were processed with respect to a single configuration schema. In other embodiments, there can be more configuration schemas processed than servers processed if multiple configuration schemas were used to process a single server.

The snapshot execution report e-mail is summarized in the subject line 706. If the snapshot returns no baseline items 712, new items 714, changed items 716, missing items 718, and/or errors encountered 720, the subject line 706 may read "clean," indicating to the user 3 that there are no issues with the configuration settings for the particular server or server group.

If there are any new items 714, changed items 716, missing items 718, and/or errors encountered 720, the snapshot execution report e-mail 700 may have a results file 800 attached. The results file 800, as illustrated in FIG. 7, lists the detailed information about the new items 714, changed items 716, missing items 718, and/or errors encountered 720 that were listed in the snapshot execution report e-mail 700. The result file 800 has a server column 802, a status column 804, an identifier column 806, a result column 808, and a schema column 810.

The server column 802 lists the server on which there is an issue with the configuration setting. The status column 804 lists the status of the issue identified, such as new, changed, missing, or error. The identifier column 806 provides information regarding the location of the configuration setting on the server. The identifier provides the user 3 enough information to locate the configuration issue in the server folders and files.

The results column 808 indicates the differences in the configuration settings identified by the configuration management application 20. In some embodiments of the invention, the results column 808 includes the item type, such as file, folder, registry key, registry hive, etc. The results column 808 may also list any differences in the size of the file. The size change indicates that data has been stored or removed, so it could indicate a change in the configuration settings of the system. The results column 808 may also display the date and time of when the current snapshot and the reference snapshot were modified. In the illustrated example, the current modified verses the reference modified timestamps illustrate that the current modified date occurred before the reference modified date, which is a flag to the user 3 that there is an issue since most of the current modified snapshots should occur after the reference modified snapshots. The modified dates illustrated in FIG. 8 indicate that a new reference snapshot was updated, but the user 3 forgot or did not update the actual server before selecting it as the new reference snapshot. The permissions for the configuration settings illustrated in FIG. 7 have also changed. The current permissions show the file name in lowercase letters, however, the reference permissions show that the file name was previously in capital letters. This difference indicates to the user 3 that the permissions to the file folder have changed and the user 3 needs to investigate why the case of the letters of the file name changed.

It should be appreciated that the changes identified in the results section 808 might take weeks to identify manually if the configuration management application 20 did not take a reference snapshot, a current snapshot, and compare the differences between them. Without the configuration management application 20 users 3 might not know that anything is ever wrong with a server until an employee at the business contacts the user 3 when an application is not working properly. Moreover, without the configuration management application 20, a user 3 would have to troubleshoot any issues to a server without having any direction as to the cause of the application or system outages. The configuration management application 20 can identify any changes in the configuration settings and give the users 3 notifications of server errors often times before the employees of the business experience any application or system outages.

In some embodiments of the invention, the configuration management application 20 stores information about every snapshot that it takes. Thus, in some embodiments, when a current snapshot is taken the configuration management application 20 stores the references that are new, changed, missing, or any errors. If the configuration management application 20 stored all of the configuration settings for each snapshot taken, the size of the data for each snapshot may be too costly to store. Therefore, any configuration settings that are not different from the previous snapshot are not stored and/or are deleted by the configuration management application 20. If there are no configuration setting differences between a current snapshot and the reference snapshot, then the configuration management application 20 stores the fact that it took a snapshot and that there were no differences from the previous configuration settings. On the other hand, if there are differences in the configuration settings, then the configuration management application 20 stores the differences identified for future reference by the users 3. In other embodiments of the invention, each snapshot including every configuration setting for every snapshot may be stored.

FIG. 8 illustrates the results interface 900, which allows a user 3 to access any snapshot, server, group of servers, application, configuration schema, results identifier, or specific file that is related to the configuration management application 20. The user 3 can select a snapshot from the snapshot filter 910 drop down list to view any snapshot taken by the configuration management application 20 in the past. The user 3 can also filter the results by selecting the result status filter link 912, which allows a user 3 to filter the results of the snapshot by new, missing, changed, error, or baseline items for any server, server group, etc. The user 3 can further filter the results by selecting the server group filter 914, server filter 916, configuration schema 918, and/or the results identifier filter 920, which will remove the associated column of the same name in the snapshot reports section 930. The user 3 can apply the filter changes by selecting the apply choices button 922, and can save the choices by selecting the save/apply choices button 924. The snapshot reports section 930 has a server group column 932, a server column 934, a configuration schema column 936, a configuration item column 938, an identifier column 940, and a results column 942. These columns list the same information as was previously described for the results file 800, in addition to other information related to the server group to which the server belongs, the associated configuration schema used, and the configuration item for which the configuration management application 20 identified the differences in the configuration settings. In some embodiments of the invention the additional information found in the results interface 900 is also included in the results file 800.

FIG. 9 illustrates an exclusion interface 1000, which allows a user 3 to exclude specific folders or files from a configuration schema. For example, there might be 10,000 configuration settings identified by a configuration schema. The user 3 knows that there are five configuration settings in the 10,000 that consistently change, however, the user 3 may not care about the five configuration settings because they are not important or do not affect the servers or applications on those servers. In some embodiments of the invention, the user 3, in this example, can exclude the five configuration settings from being identified and appearing in report file 800 or the results interface 900. In this way, the user 3 will not have to view and check the results of excluded configuration settings that the user 3 may not care about every time the configuration management application 20 is run for a specific server or configuration schema. The user 3 can select the configuration schema from which the user 3 wants to make exclusions using the edit link 432 in the configuration schema interface 400. The exclusion interface 1000 has a configuration schema section 1002 that lists the configuration schema for which the exclusions are being made. In order to exclude configuration settings from being reported by the configuration management application 20, the user 3 selects the appropriate box in the exclusion column 1016 of the exclusion section 1010. The selected excluded boxes 1018 prevent the configuration management application 20 from reporting on the configuration item listed in the corresponding configuration item column 1012 and/or for each identifier listed in the corresponding results section 1014. In some embodiments of the invention, the exclusions will stay in place over time even if the user 3 updates the reference list. Exclusions can be dynamically added and removed over time without impacting previously captured data.

In some embodiments of the invention, if a user 3 makes any changes to anything in the change management application 20 the user 3 has to insert comments as to why the user 3 made the change, so that any changes made to the configuration management application 20 are tracked. Therefore, every time a user 3 adds a server, adds a server configuration schema, adds a configuration item, changes a server, changes a configuration schema, changes a configuration item, deletes a server, deletes a configuration schema, deletes a configuration item, etc. the user 3 enters comments for tracking purposes.

Embodiments of the configuration management application 20 can be useful in both new builds and existing software and server systems. The configuration management application 20 may be especially helpful for new builds in that it can be used to diagnostically check the configurations of all the new hardware and software before implementation. Therefore, the user 3 can determine whether the hardware and software are all properly installed prior to the release within the business. Any issues identified after release would be the results of problems with the software or hardware, how the vender told the users 3 to install the hardware or software, and/or unauthorized access to the hardware or software.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator- and/or human-implemented steps in order to carry out an embodiment of the present invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A method comprising:
capturing a reference snapshot of a first plurality of configuration settings for a first server;

capturing a current snapshot of a second plurality of configuration settings for a second server; and determining, using a processing device, differences between the first plurality of configuration settings in the reference snapshot with the second plurality of configuration settings in the current snapshot.

2. The method of claim 1, further comprising:
assigning a configuration schema to a first server; and
wherein capturing the reference snapshot of the first plurality of configuration settings for a first server comprises following the configuration schema assigned to the first server.

3. The method of claim 1, further comprising:
assigning a configuration schema to the second server; and
wherein capturing the current snapshot of the second plurality of configuration settings for the second server comprises following the configuration schema assigned to the second server.

4. The method of claim 3, further comprising:
assigning the reference snapshot to the configuration schema.

5. The method of claim 1, further comprising:
identifying the first server from which to take the reference snapshot of the first plurality of configuration settings.

6. The method of claim 1, further comprising:
creating a configuration schema; and
assigning the configuration schema to the first server or the second server to capture the first plurality of configuration settings or the second plurality of configuration settings.

7. The method of claim 6, further comprising;
assigning a plurality of configuration items to the configuration schema describing where to capture the first plurality of configuration settings or the second plurality of configuration settings.

8. The method of claim 1, wherein the first server and the second server are the same server.

9. The method of claim 1, wherein the first server and the second server are different servers.

10. The method of claim 1, further comprising;
capturing a reference snapshot of a third plurality of configuration settings for a first server;
capturing a current snapshot of a fourth plurality of configuration settings for a second server; and
determining differences between the third plurality of configuration settings in the reference snapshot with the fourth plurality of configuration settings in the current snapshot.

11. The method of claim 1, wherein the differences are new settings, changed settings, or missing settings.

12. The method of claim 1, further comprising:
creating a report illustrating differences identified between the first plurality of configuration settings in the reference snapshot with the second plurality of configuration settings in the current snapshot.

13. The method of claim 12, further comprising:
identifying an excluded configuration setting; and
excluding the excluded configuration setting from the report.

14. The method of claim 12, wherein the differences between the first plurality of configuration settings in the reference snapshot and the second plurality of configuration settings in the current snapshot are illustrated by displaying values or nomenclature for the differences identified.

15. The method of claim 1, wherein the reference snapshot is a baseline snapshot.

16. The method of claim 1, further comprising:
creating a report illustrating an error encountered in capturing at least one configuration setting.

17. A system comprising:
a memory device having computer readable program code store thereon; and
a processing device operatively coupled to the memory device, wherein the processing device is configured to execute the computer readable program code for:
capturing a reference snapshot of a first plurality of configuration settings for a first server;
capturing a current snapshot of a second plurality of configuration settings for a second server; and
determining differences between the first plurality of configuration settings in the reference snapshot with the second plurality of configuration settings in the current snapshot.

18. The system of claim 17, wherein the processing device is further configured to execute the computer readable program code for:
assigning a configuration schema to a first server; and
wherein capturing the reference snapshot of the first plurality of configuration settings for a first server comprises following the configuration schema assigned to the first server.

19. The system of claim 17, wherein the processing device is further configured to execute the computer readable program code for:
assigning a configuration schema to the second server; and
wherein capturing the current snapshot of the second plurality of configuration settings for the second server comprises following the configuration schema assigned to the second server.

20. The system of claim 19, wherein the processing device is further configured to execute the computer readable program code for:
assigning the reference snapshot to the configuration schema.

21. The system of claim 17, wherein the processing device is further configured to execute the computer readable program code for:
identifying the first server from which to take the reference snapshot of the first plurality of configuration settings.

22. The system of claim 17, wherein the processing device is further configured to execute the computer readable program code for:
creating a configuration schema; and
assigning the configuration schema to the first server or the second server to capture the first plurality of configuration settings or the second plurality of configuration settings.

23. The system of claim 22, wherein the processing device is further configured to execute the computer readable program code for:
assigning a plurality of configuration items to the configuration schema describing where to capture the first plurality of configuration settings or the second plurality of configuration settings.

24. The system of claim 17, wherein the first server and the second server are the same server.

25. The system of claim 17, wherein the first server and the second server are different servers.

26. The system of claim 17, wherein the processing device is further configured to execute the computer readable program code for:
capturing a reference snapshot of a third plurality of configuration settings for a first server;

capturing a current snapshot of a fourth plurality of configuration settings for a second server; and determining differences between the third plurality of configuration settings in the reference snapshot with the fourth plurality of configuration settings in the current snapshot.

27. The system of claim 17, wherein the differences are new settings, changed settings, or missing settings.

28. The system of claim 17, wherein the processing device is further configured to execute the computer readable program code for:

creating a report illustrating differences identified between the first plurality of configuration settings in the reference snapshot with the second plurality of configuration settings in the current snapshot.

29. The system of claim 28, wherein the processing device is further configured to execute the computer readable program code for:

identifying an excluded configuration setting; and excluding the excluded configuration setting from the report.

30. The system of claim 28, wherein the differences between the first plurality of configuration settings in the reference snapshot and the second plurality of configuration settings in the current snapshot are illustrated by displaying values or nomenclature for the differences identified.

31. The system of claim 17, wherein the reference snapshot is a baseline snapshot.

32. The system of claim 17, wherein the processing device is further configured to execute the computer readable program code for:

creating a report illustrating an error encountered in capturing at least one configuration setting.

33. A computer program product, the computer program product comprising at least one non-transitory computer-readable medium having computer-readable program code portions embodied therein, the computer-readable program code portions comprising:

an executable portion configured for capturing a reference snapshot of a first plurality of configuration settings for a first server;

an executable portion configured for capturing a current snapshot of a second plurality of configuration settings for a second server; and an executable portion configured for determining differences between the first plurality of configuration settings in the reference snapshot with the second plurality of configuration settings in the current snapshot.

34. The computer program product of claim 33, wherein the computer-readable program code portions further comprises:

an executable portion configured for assigning a configuration schema to a first server; and wherein the executable portion configured for capturing the reference snapshot of the first plurality of configuration settings for a first server comprises following the configuration schema assigned to the first server.

35. The computer program product of claim 33, wherein the computer-readable program code portions further comprises:

an executable portion configured for assigning a configuration schema to the second server; and wherein the executable portion configured for capturing the current snapshot of the second plurality of configuration settings for the second server comprises following the configuration schema assigned to the second server.

36. The computer program product of claim 35, wherein the computer-readable program code portions further comprises:

an executable portion configured for assigning the reference snapshot to the configuration schema.

37. The computer program product of claim 33, wherein the computer-readable program code portions further comprises:

an executable portion configured for identifying the first server from which to take the reference snapshot of the first plurality of configuration settings.

38. The computer program product of claim 33, wherein the computer-readable program code portions further comprises:

an executable portion configured for creating a configuration schema; and an executable portion configured for assigning the configuration schema to the first server or the second server to capture the first plurality of configuration settings or the second plurality of configuration settings.

39. The computer program product of claim 38, wherein the computer-readable program code portions further comprises:

an executable portion configured for assigning a plurality of configuration items to the configuration schema describing where to capture the first plurality of configuration settings or the second plurality of configuration settings.

40. The computer program product of claim 33, wherein the first server and the second server are the same server.

41. The computer program product of claim 33, wherein the first server and the second server are different servers.

42. The computer program product of claim 33, wherein the computer-readable program code portions further comprises:

an executable portion configured for capturing a reference snapshot of a third plurality of configuration settings for a first server;

an executable portion configured for capturing a current snapshot of a fourth plurality of configuration settings for a second server; and an executable portion configured for determining differences between the third plurality of configuration settings in the reference snapshot with the fourth plurality of configuration settings in the current snapshot.

43. The computer program product of claim 33, wherein the differences are new settings, changed settings, or missing settings.

44. The computer program product of claim 33, wherein the computer-readable program code portions further comprises:

an executable portion configured for creating a report illustrating differences identified between the first plurality of configuration settings in the reference snapshot with the second plurality of configuration settings in the current snapshot.

45. The computer program product of claim 44, wherein the computer-readable program code portions further comprises:

an executable portion configured for identifying an excluded configuration setting; and an executable portion configured for excluding the excluded configuration setting from the report.

46. The computer program product of claim 44, wherein the differences between the first plurality of configuration settings in the reference snapshot and the second plurality of configuration settings in the current snapshot are illustrated by displaying values or nomenclature for the differences identified.

47. The computer program product of claim 33, wherein the reference snapshot is a baseline snapshot.

48. The computer program product of claim 33, wherein the computer-readable program code portions further comprises:

an executable portion configured for creating a report illustrating an error encountered in capturing at least one configuration setting.

* * * * *